United States Patent
Styles

(10) Patent No.: US 7,797,328 B2
(45) Date of Patent: Sep. 14, 2010

(54) SYSTEM AND METHOD OF SEARCHING FOR STORY-BASED MEDIA

(76) Inventor: Thomas Lane Styles, 1440 E. Broadway Rd., Apt. 2165, Tempe, AZ (US) 85282

( * ) Notice: Subject to any disclaimer, the term of this patent is extended or adjusted under 35 U.S.C. 154(b) by 461 days.

(21) Appl. No.: 11/306,178

(22) Filed: Dec. 19, 2005

(65) Prior Publication Data

US 2008/0021894 A1 Jan. 24, 2008

Related U.S. Application Data

(60) Provisional application No. 60/638,186, filed on Dec. 21, 2004.

(51) Int. Cl.
*G06F 7/00* (2006.01)
(52) U.S. Cl. .................. 707/758; 707/914; 725/53
(58) Field of Classification Search .......... None
See application file for complete search history.

(56) References Cited

U.S. PATENT DOCUMENTS

| | | | |
|---|---|---|---|
| 5,483,278 A | 1/1996 | Strubbe et al. ............ 725/61 |
| 5,604,855 A * | 2/1997 | Crawford .................. 345/473 |
| 5,671,411 A | 9/1997 | Watts et al. ................ 725/43 |
| 5,880,768 A | 3/1999 | Lemmons et al. .......... 725/41 |
| 5,905,981 A * | 5/1999 | Lawler ....................... 707/4 |
| 6,005,565 A | 12/1999 | Legall et al. ............. 715/721 |
| 6,088,722 A | 7/2000 | Herz et al. ................ 709/217 |
| 6,118,923 A * | 9/2000 | Rodriguez ................. 386/69 |
| 6,134,547 A | 10/2000 | Huxley et al. .............. 707/5 |
| 6,185,592 B1 * | 2/2001 | Boguraev et al. ........ 715/256 |
| 6,212,527 B1 * | 4/2001 | Gustman .................. 707/102 |
| 6,314,575 B1 | 11/2001 | Billock et al. ............. 725/87 |
| 6,408,437 B1 * | 6/2002 | Hendricks et al. ........ 725/132 |
| 6,598,040 B1 * | 7/2003 | Cragun et al. ............... 1/1 |
| 6,602,297 B1 * | 8/2003 | Song ........................ 715/210 |
| 6,622,148 B1 | 9/2003 | Noble et al. ............ 707/104.1 |
| 6,631,522 B1 * | 10/2003 | Erdelyi ..................... 725/53 |
| 6,732,369 B1 | 5/2004 | Schein et al. .............. 725/39 |
| 7,184,959 B2 * | 2/2007 | Gibbon et al. ............ 704/270 |
| 7,467,164 B2 * | 12/2008 | Marsh ......................... 1/1 |
| 7,509,581 B1 * | 3/2009 | Song et al. ............... 715/721 |

(Continued)

OTHER PUBLICATIONS

Volker Roth "Content-based retrieval from digital video", Image and Vision Computing, vol. 17 Issue 7, May 1999, p. 531-540.*

(Continued)

*Primary Examiner*—Neveen Abel Jalil
*Assistant Examiner*—Vei-Chung Liang
(74) *Attorney, Agent, or Firm*—Snell & Wilmer L.L.P.

(57) ABSTRACT

Systems and methods for facilitating a search for story-based media search criteria for use in searching for story-based works are disclosed. The method may include the steps of: facilitating a search for and receiving input from a user that specifies a first desired character type, a desired type of interaction between a first character and a second character in a work, and/or other story-based search criteria, and searching a work database, and identifying at least one of the plurality of works that has a first work character type, desired type of interaction, and/or other story-based search criteria that is substantially similar to the specified story-based search criteria.

18 Claims, 13 Drawing Sheets

U.S. PATENT DOCUMENTS

| | | | | |
|---|---|---|---|---|
| 2001/0056427 | A1* | 12/2001 | Yoon et al. | 707/100 |
| 2002/0059581 | A1 | 5/2002 | Billock et al. | 725/25 |
| 2002/0059606 | A1* | 5/2002 | Kikinis et al. | 725/51 |
| 2002/0116392 | A1* | 8/2002 | McGrath et al. | 707/104.1 |
| 2003/0023976 | A1 | 1/2003 | Kamen et al. | 725/53 |
| 2004/0056879 | A1* | 3/2004 | Erdelyi | 345/716 |
| 2004/0123231 | A1* | 6/2004 | Adams et al. | 715/500.1 |
| 2005/0021653 | A1* | 1/2005 | Song et al. | 709/207 |
| 2005/0262069 | A1* | 11/2005 | Lee et al. | 707/3 |

OTHER PUBLICATIONS

Jesse Jin and Ruiyi Wang, The development of an online video browsing system, VIP 2001, Sydney, Australia, 2002.*

Adah, et al., "The Advanced Video Information System: data structure and query processing", Multimedia Systems (1996) 4: 172-186. Aug. 1996.*

Lee, et al., "Querying Multimedia Presentations Based on Content", IEEE Transactions on Knowledge and Data Engineering, vol. 11, No. 3, May/Jun. 1999 pp. 361-385.*

\* cited by examiner

⇒ Step 1 [Help]
Step 2
Step 3

▷ Availability
▷ Characters
▷ Credits
▽ Dramatic Behaviors
    Anger
    Emotionally Hurt
    Crying
    Romance
    Expression of Love
    Deceit
    Jealousy
    Inspiration
▷ Genres
▷ Other Characteristics
▷ Psychological Factors
▷ Relationships
▷ Themes

Figure 1

Step 1
Step 2
⇒ Step 3 [Help]

You elected to search for films with Romantic behavior and Heroic Story. You elected to order the results by the following criteria.

- Romantic Behavior (importance = 10)
- Jealous behavior (importance = 7)
- Heroic Story (importance = 5)

Execute Search

Results:

1. Triumph of Love - Information Sheet
   Scores:
   | | | |
   |---|---|---|
   | Romantic Behavior | 9 | Suggestions: |
   | Jealous Behavior | 8 | Find Theaters |
   | Heroic Story | 10 | Visit Website |

2. Sally's Betrayal - Information Sheet
   Scores:
   | | | |
   |---|---|---|
   | Romantic Behavior | 7 | Suggestions: |
   | Jealous Behavior | 10 | Find DVD |
   | Heroic Story | 7 | Show trailer |
   | | | Find VHS |

3. Midnight - Information Sheet
   Scores:
   | | | |
   |---|---|---|
   | Romantic Behavior | 9 | Suggestions: |
   | Jealous Behavior | 0 | Find Download |
   | Heroic Story | 7 | Visit Website |

Figure 4 column 1

Availability
- DVD *
- Internet Download *
- Movie Theaters *
- Television
    - Broadcast *
    - Cable TV *
    - Pay-Per-View *
- VHS *

Characters
- Character A
    - Age *
        - Child
        - Teenager
        - Adult
        - Middle-Aged
        - Senior
    - Hero *
        - Becomes Hero *
        - Flawed Hero *
        - Strong Hero *
    - Occupation
        - Homemaker *
        - Paid Occupation *
            - Blue Collar *
            - Technical *
            - Entrepreneur *
            - Executive *
            - Gov *
                - Judge *
                - Military *
                - Other *
                - Police *
                - Politician *
            - Lawyer *
            - Medical *
            - Scientist *
            - Teacher *
        - Retired *
        - Student *
        - Unemployed *
        - Volunteer Work *
    - Personality
        - Bold *
        - Devious *
        - Flirtatious *
        - Friendly *
        - Sarcastic *
        - Strong-Willed *
        - Temperamental *
        - Troubled *
    - Portrayal
        - Negative *
        - Neutral *
        - Positive * column 2

- Sex *
    - Female
    - Male
- Character B
    - [Same as for Character A]
- Character C
    - [Same as for Character A]
- Character D
    - [Same as for Character A]

Credits **
- Actors
- Director
- Producer
- Writer
- Production Companies
- Crew Dramatic Behaviors
- Anger *
- Emotionally Hurt *
- Crying *
- Romance *
- Expression of Love *
- Deceit *
- Jealousy *
- Inspiration *

Genres
- Action *
    - Crime-Police *
    - War Movie *
    - Secret Agent *
    - Sports *
- Children's *
- Comedy *
    - Slapstick *
    - Spoof-Satire *
    - Dry Humor *
    - Unconventional Behavior *
    - Situation Comedy *
- Drama *
    - Love Story *
- Fantasy *
- Horror *
- Message Emphasized *
- Period Piece *
    - Western *
- Romantic Comedy *
- Science Fiction *
- True Story *

Other
- Animated *
- Color *
- Language
    - Dubbed *
    - Original *
    - Subtitled *
- Length *
- Major Release *

Figure 5A

```
MPAA Ratings                                    Ethics *
        Content Warnings *                              In Business *
                [Warning codes go here]                 In Public Life *
        Overall Rating *                                In Personal Relations *
                G                                       In Professions *
                PG                                      In Academia *
                PG-13                           Individualism *
                R                               Personal Qwest *
                NC-17                                   Heroism *
                X                                       Motivational Level
        Title *                                                 High *
        Year Released *                                         Inadequate *
Psychological Factors                                           Increased *
        Heroic *                                        Objectives
        Ending                                                  Business *
                Positive *                              Independence *
                Tragedy *                               Intellectual *
        Force *                                                 Political *
        Romance *                                               Relationships *
        Sex *                                                   Spiritual *
                Sexual Interactions *           Optimism *
                Sexual Relationships *          Pessimism *
                Sexy Females *                  Realism *
                Sexy Males *                    Political *
        Tone                                            Equality *
                Dark *                                  Freedom *
                Light *                                 Issues
        Violence *                                              Social *
                Graphic *                               Economic *
                Not Graphic *                           International *
Relationships                                   Nature of Government *
        Relationship 1                          Oppression *
                Attraction *                    Politics *
                        Casual *                Viewpoints
                        Dating *                        Conservative *
                        Long-Term Relationship *        Liberal *
                        Love Affair *           War *
                        Unfulfilled Desire *    Religion *
                Family                                  Religious Teachings *
                        Father-Daughter *               Viewpoints
                        Father-Son *                            Agnostic-Atheist *
                        Grandparent *                           Faith in God *
                        Husband-Wife *                  Freedom of Religion *
                        Mother-Daughter *       Social *
                        Mother-Son *                    Gender Relations *
                        Sibling *                       Family Issues *
                        Other *                         Friendship *
                Friendship *                            Racial Issues *
        Relationship 2                                  Rebellion *
                [Same as for Relationship 1]            Nonconformist *
Themes                                                  Sex *
        Collective Identity *                           Love *
                Collectivism *                          Alienation *
                Community *                             Popularity *
                National Identity *             Truth *
                Other Groups *
        Environmentalism * column 3                                column 4
```

Figure 5B

Please select the two characters in Relationship 1.
When finished, you can define one or both characters, if desired, using the "Characters" category.
 
OK    Cancel
Figure 6

Relationship 1/Attraction/Love Affair

● Relationship 1 has love affair
○ Relationship 1 does not have love affair
☑ Limit search to such films min (0) [————————■————————] max (10)
Importance Relationship 1/Attraction/Casual ○ Relationship 1 has casual attraction
● Relationship 1 does not have casual attraction
☐ Limit search to such films min (0) [————————■————————] max (10)
Importance

SYSTEM AND METHOD OF SEARCHING FOR STORY-BASED MEDIA

CROSS-REFERENCE TO RELATED APPLICATIONS

This application claims priority to, and the benefit of, U.S. Provisional Application Ser. No. 60/638,186, entitled "SYSTEM AND METHOD OF SEARCH FOR STORY-BASED MEDIA," filed Dec. 21, 2004, which is incorporated herein by reference.

FIELD OF INVENTION

The invention generally relates to systems and methods for facilitating a search for a work, and more particularly, for facilitating selection of story-based search criteria and searching for works based on story-based criteria.

BACKGROUND OF THE INVENTION

Consumers of entertainment have a variety of tastes, likes, and dislikes. These consumers often turn to lists and other search devices to find the type of entertainment that suits their desires. Many web sites allow users to perform a title search of a movie database or a book database to find a movie or book having a key word in the title. Some such web sites facilitate searching for movies with a "G" rating from the Motion Picture Association of America. Many web sites allow the user to search for works that have two or three of such limited search inputs. For example, a user may search for a movie based on a key word in the title and an actor's name. Some patents teach methods for such searches. None of the web sites or patents, however, offers the kind of searches that are of most interest to consumers of entertainment. People care the most about the story of the movie or book. People want to find movies or books with their choices of themes, types of characters, types of relationships, psychological content, genres or other characteristics of the story. Thus, there exists a need for systems and methods that facilitate searching for story-based media based on story-related characteristics.

SUMMARY OF THE INVENTION

In accordance with various aspects of the present invention, an exemplary method for assisting a user in searching for a work, represented in a database by a work name, comprises the steps of: receiving input from the user that specifies a first desired character type, wherein the first desired character type is specified upon selection of a first desired character quality from among a plurality of first desired character qualities; searching a work database, wherein the work database stores a plurality of work names associated respectively with a plurality of works, wherein each of the plurality of works is associated with at least one work character, wherein each of the at least one work character is associated with more than one work character quality; wherein the plurality of works comprise at least one of a movie, a book, a novel, and a play; and identifying at least one of the plurality of works that has a first work character that has a character quality that is substantially similar to the specified first desired character type.

In accordance with other aspects of the present invention, an exemplary method of assisting a user in searching for a work from among a number of works, represented in a database by a work name, based on specified desired character interactions within the work, comprises the steps of: receiving a first input from a user specifying a desired type of interaction between a first character and a second character in a work, wherein a work is one of a movie, a book, a novel, and a play; and identifying, in a work database, a work that includes at least a first character and a second character whose interaction in the work is substantially similar to the specified desired type of interaction.

In accordance with other aspects of the present invention, an exemplary method for assisting a user in a two-stage search for a work based on story-based criteria, wherein the work is represented in a database by a work name, comprises an initial stage entailing a search for a first desired story-based criterion, wherein the search comprises the steps of: receiving at least one input from the user denoting the user's interest in story-based criteria; and identifying a first desired story-based criterion, from among a plurality of story-based criteria; and comprises a subsequent stage comprising the steps of: searching a work database, wherein the work database stores a plurality of work names associated respectively with a plurality of works, wherein the work database further stores at least one work story-based criterion that is associated with a first work of the plurality of works; wherein the plurality of works comprise at least one of a movie, a book, a novel, and a play; and identifying at least one of the plurality of works that has a story-based criterion that is substantially similar to the identified first desired story-based criterion.

In accordance with other aspects of the present invention, an exemplary graphical method for assisting a user in searching for a work, comprises the steps of: displaying icons that represent character types desired by the user; receiving, for one or more of the icons, at least one user input that specifies desired qualities of the character type, where each desired quality is selected from among a plurality of character qualities; receiving an input referencing two characters, wherein the input graphically displays a connection between the icons, and wherein each graphically displayed connection represents a relationship between characters; receiving user input, associated with each graphical connection, representing desired qualities of the relationship between the character types that correspond to the icons so connected, where each desired quality is selected from among a plurality of relationship qualities; and, searching a work database that contains a plurality of works and identifying at least one of the plurality of works that has character(s) and relationship(s) substantially similar to the character type(s) and relationship(s) desired by the user, wherein the plurality of works comprise at least one of a movie, a book, a novel, and a play.

In accordance with other aspects of the present invention, an exemplary method of assisting a user in searching for a work through use of story-based criteria, comprises the steps of: (a) assisting the user in finding and selecting story-based criteria comprising the steps of presenting a plurality of story-based search criteria, receiving inputs representing selections of story-based criteria that are to be used in a search, receiving indications of the importance levels of each selected story-based criterion; (b) searching a work database, wherein the work database stores a plurality of work names associated respectively with a plurality of works, wherein each of the plurality of works is associated with at least one work story-based criterion, wherein the plurality of works comprise at least one of a movie, a book, a novel, and a play; (c) identifying at least one of the plurality of works where the works comprise work story-based criteria that are substantially similar to the selected story-based criteria; and (d) presenting the list of works in order of relevancy based on the received indications of importance and on the degree to which the works comprise story-based criteria that are substantially similar to the selected story-based criteria.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

FIG. 1 illustrates an exemplary user interface during Step One of an exemplary story-based media search system;

FIG. 4 illustrates an exemplary user interface during Step Three of an exemplary story-based media search system;

FIGS. 5A and 5B illustrate an exemplary hierarchy of search criteria of an exemplary story-based media search system;

FIG. 6 illustrates an exemplary dialog box for selection of two characters in a relationship defined by the user in an exemplary story-based media search system;

FIGS. 7A and 7B illustrate another exemplary user interface during Step Two of a Character/Relationship search example in an exemplary story-based media search system;

DETAILED DESCRIPTION

Figure 2:
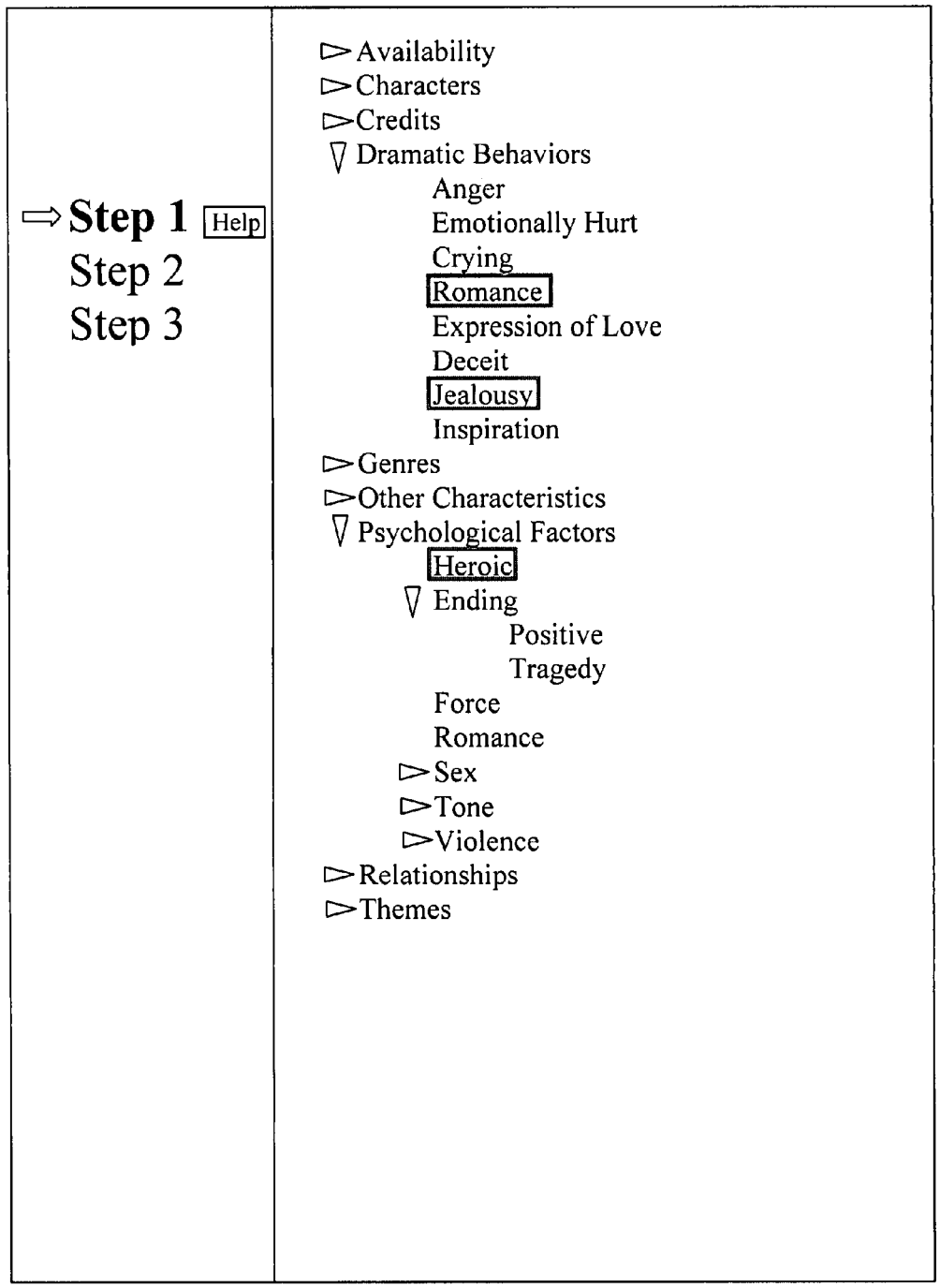
FIG. 2 illustrates another exemplary user interface during Step One with expanded portions of the browse tree and three selected search criteria of an exemplary story-based media search system.

While the exemplary embodiments herein are described in sufficient detail to enable those skilled in the art to practice the invention, it should be understood that other embodiments may be realized and that logical and physical changes may be made without departing from the spirit and scope of the invention. Thus, the following detailed description is presented for purposes of illustration only and not of limitation. Although primarily described herein in terms of movies, the description herein is equally applicable to other story-based works, including books, novels, plays, and/or the like.

In accordance with various exemplary embodiments of the invention, a method is provided for assisting a user in searching for a work based on character types, based on types of relationships between characters, and/or based on other story-based criteria. As an example of the utility of such a method, in one example, a user wishing to watch an entertaining movie might search for a movie that stars a flawed hero who has a romantic relationship with a character that has a flirtatious personality. By way of another example, the user could search for a movie that includes a father-son relationship, where the son plays a student role. Such searches facilitate a movie watcher in finding the kind of entertainment that most appeals to them at that moment. Performing such searches is facilitated by the methods and systems described in exemplary embodiments herein. In particular, a two stage search process makes it easy to first identify the story-based criteria that are to form a part of the search and then search based on those criteria. Thus, such searches help identify a movie that is much more likely to suit a users tastes or desires than traditional methods of searching for movies, such as searching for a movie based on a particular actress name or based on whether it is rated PG-13.

The various exemplary embodiments described herein recognize a need for better systems and methods for finding entertainment. In light of the subjective nature of many of the characteristics that matter to individuals who are seeking an entertaining work, in accordance with various aspects of the invention, a work's characteristics can be described based on the degree to which that work meets one or more story-based criteria. Then an individual may search for a work based on the degree to which it satisfies desired story-based criteria. In this manner, individuals can now search for story-based works in a manner that facilitates finding the type of entertainment in which they are most interested, and with a level of specificity never before obtainable.

An exemplary method comprises the steps of: facilitating the identification of character types, relationship types, and/or other story-based criteria (Step One); receiving further input to define how the identified story-based criteria affect the search (Step Two); and searching for and returning results of the search for works that are substantially similar to the character types, relationship types, and/or other story-based criteria identified in the first two steps (Step Three).

Thus, in accordance with a first exemplary embodiment of the invention, a method of assisting a user in searching for a work based on a desired character type comprises the steps of: receiving input from the user that specifies a first desired character type, searching a work database, and identifying a work that substantially matches the specified desired character type.

Figure 9:
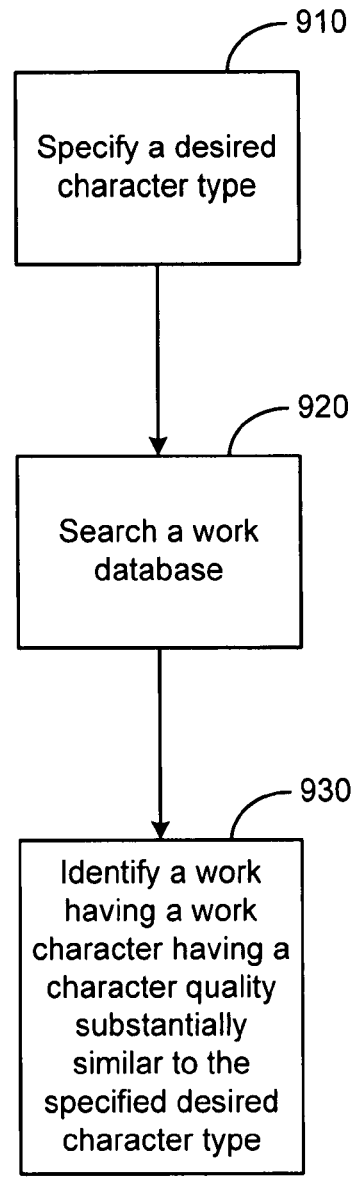
FIG. 9 illustrates an exemplary method of searching for story-based media.

An exemplary method 900 comprises, with reference to FIG. 9, the steps of: receiving input from the user that specifies a desired character type (Step 910), searching a work database comprising a plurality of works (Step 920), and identifying at least one of the plurality of works that has a first work character that has a character quality that is substantially similar to the specified first desired character type (Step 930). Specifying the desired character type (Step 910) may involve selection of desired character qualities from, for example, a hierarchal tree of character qualities.

Figure 10:
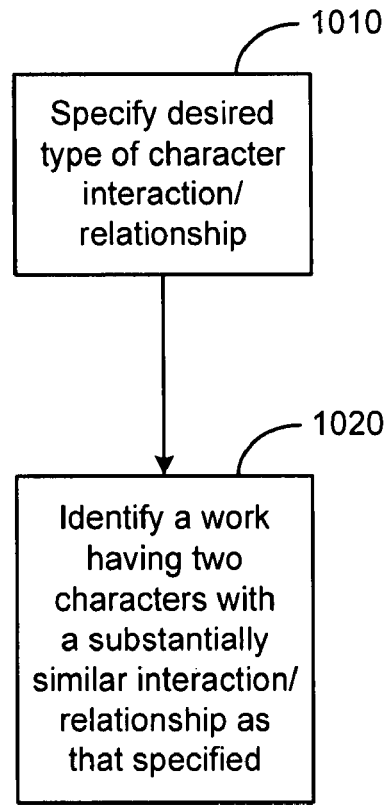
FIG. 10 illustrates another exemplary method of searching for story-based media.

Exemplary method 1000 comprises, with reference to FIG. 10, the steps of: receiving a first input from a user specifying a desired type of interaction between a first character and a second character in a work (Step 1010), and identifying, in a work database, a work that includes at least a first character and a second character whose interaction in the work is substantially similar to the specified desired type of interaction (Step 1020).

Figure 11:
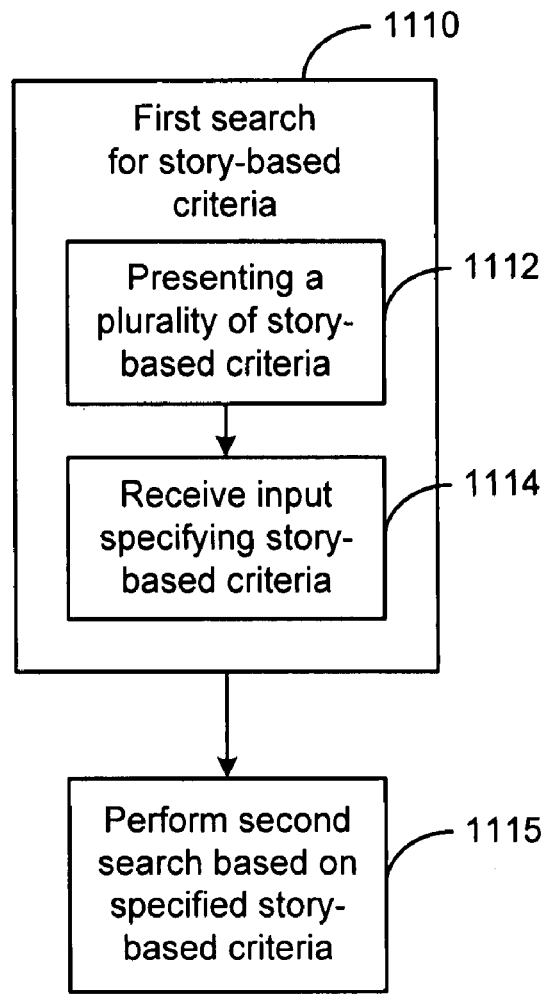
FIG. 11 illustrates another exemplary method of searching for story-based media.

Another exemplary method 1100 comprises, with reference to FIG. 11, a two stage search having an initial stage entailing a search for a first desired story-based criterion (Step 1110), wherein the initial stage further includes the steps of receiving at least one input from the user denoting the user's interest in story-based criteria (Step 1112), and identifying a first desired story-based criterion, from among a plurality of story-based criteria (Step 1114). The two stage search further comprises a subsequent stage for performing a search based on the criteria specified in the initial stage (Step 1115). The subsequent stage search may comprise the steps of searching a work database and identifying at least one work that has a story-based criterion that is substantially similar to the specified first desired story-based criterion. Exemplary embodiments of some of these methods and steps are described in more detail below.

In accordance with an exemplary embodiment of the present invention, a database is configured to include the story-based characteristics of a large number of story-based works. In an exemplary embodiment, the story-based characteristics are stored as data with values that are assigned at least partly by human estimation. Given the large number of often subjective story-based criteria that can be relevant to typical works, the database may comprise numerous fields of data for each story-based work. It is desirable for the user to be able to conduct a search based on almost any subset of these data fields; however, identifying the desired subset of data fields can be a time consuming task.

In accordance with one aspect of the present invention, an exemplary method facilitates navigating the user through a large set of available search criteria. For example, the search criteria may be hierarchally organized. In an exemplary embodiment, the user may navigate within this hierarchy and identify the search criteria that are of interest.

Upon selection of the desired search criteria, these selected desired search criteria may then be applied in a database search. In an exemplary embodiment, the database search may comprise the steps of: 1) formulation of a query that determines which titles are returned and listed for the user, and 2) determination of the order of the listed titles. Furthermore, in one exemplary embodiment of the present invention, for each of the selected search criteria, the user sets: 1) a Boolean variable that indicates whether the criterion affects the query formulation, and 2) the degree to which the criterion affects the order of titles returned by the query. Thus, in one example, when many titles are returned by the query, the titles are listed in order of degree to which they match to the user's interests.

In accordance with an exemplary embodiment of the present invention, the system and methods are configured to facilitate searching for story-based works such as films, novels, or plays. The term "work" is used herein to refer to such story-based works. In various exemplary embodiments, a relational database (or other type of database) is configured to store information about a large number of works. The database need not contain the work itself. For each work, the database may be configured to store text data such as title, credits and synopsis.

The database may also store many numeric data items that measure characteristics of a work. In one exemplary embodiment, the numeric data items are the numbers from zero to ten, representing, for example, on a relative basis or scale the degree to which a work embodies a story-based characteristic. For example, the amount of romance could be any number from zero, which means complete absence of romance, to ten, which means the maximum romance anyone would expect. Some data items are normally either zero or ten. For example, to indicate whether a character is a scientist, a zero means no and a ten means yes.

It should be recognized that the numeric data items may use any scale of numbers, such as 10 to 100, −10 to 10, and/or the like. Furthermore, the numeric data items may be represented through fractional values and do not need to be integers. Moreover, other systems of quantifying the degree to which a work exhibits a particular characteristic or data sub-element may be equivalently used and fall within the scope of the present invention. Thus, the work database may use any suitable method of storing data from which it can be determined the degree to which the work exhibits a particular story-based criterion relative to the degree to which other works in the database exhibit that criterion.

Exemplary Multi-Step Process

In various exemplary embodiments, the user may perform a search using a three step process. In Step One, the user selects the search criteria that are to be used in Steps Two and Three. The user may select from a subset of, for example, more than 200 available search criteria. These search criteria are organized, for example, hierarchally, so that the user may easily find/select the desired criteria within a browse tree. In Step Two of the search process, the user may define the way each selected search criterion affects the query of Step Three and the order of results returned by the query. In Step Three, the query is executed and the ordered results are displayed. Steps One and Two comprise the initial stage of the search; Step Three comprises the subsequent stage of the search.

With reference now to FIGS. 1 through 4, an exemplary graphical user interface for the application comprises an application window that is split so that the left window informs the user that the process has three steps, and indicates the current step. The content in the right window depends on which step is current. The user may make selections in the right window and then move on to the next step. The system is configured to move from one step to the next when the user selects the name of that step in the left window, for example, by clicking on the graphical representation for that step with a mouse.

Step One

In accordance with an exemplary embodiment of the present invention, in the hierarchy of search criteria, each node may represent a category of search criteria. Furthermore, each node may have child nodes which are subcategories of their parent. The hierarchy is also called a tree.

Tree nodes that have no children are called leaf nodes. In Step One of the search method, the user may use an object known as a "browse tree" in order to view the tree and select the nodes that identify his/her desired search criteria. The browse tree is displayed, for example, on a monitor. At a given time, some nodes are visible in the browse tree, while others may not be visible. Children of the tree root identify the broadest categories and these nodes are generally visible. If a node is visible, then its parent (if the parent is not the root node) is also visible. If a node is visible, then generally either all or none of its children are visible. If none of its children are visible, then the user is able to "expand" the node, making all of its children visible. If all the children of a node are visible, then the user is able to "contract" the node, making all the children and their descendents invisible With reference to FIG. 1, during Step One of the search method an exemplary user interface may include parent nodes such as Dramatic Behaviors and Relationships. In FIG. 2, the user has expanded some nodes that did not have visible children in FIG. 1. If a node has children that are not visible, then the user may expand this node by clicking (using the mouse) on the rightward-pointing triangle that is immediately left of the node name. When a node is expanded, its triangle rotates to point downward and the indented list of children appears immediately below their parent. In order to contract a node, the user clicks on its downward-pointing triangle, and the triangle rotates to point rightward while the children and descendents disappear. Leaf nodes have no triangle next to them. In FIG. 1 the user has expanded the node named "Dramatic Behaviors" to reveal a number of specific behaviors that may be selected. In FIG. 2 the user also expanded the "Psychological Factors" node and then expanded one of its children named "Ending".

The user may select nodes that identify the qualities that the user likes in a work. The user selects a node using a specific operation, for example, by positioning the pointer over the node name and clicking once on the left button of the mouse. When a node is selected, its text is highlighted. In FIG. 2, the user has selected the "Romance" and "Jealousy" qualities under the "Dramatic Behaviors" category; the user also selected the "Heroic" psychological factor under the "Psychological Factors" category. In accordance with one exemplary embodiment, every leaf node is selectable. Some non-leaf nodes are also selectable, while others may be unselectable nodes that exist to provide access to their children.

In accordance with an exemplary embodiment of the present invention, the user may perform other actions on a node by clicking once on the right button of the mouse, thus bringing up a menu. The user may then select menu items that cause actions such as: 1) deselecting the node, 2) opening the help screen of the node, or 3) showing text that defines the meaning of the search criterion named by the node. Other actions and methods of taking actions may also be used as appropriate.

With reference now to FIGS. 5A and 5B, an exemplary method of searching for story-based media may include search criteria such as those identified in columns 1-4 of those figures. Furthermore, variations, subcategories of these search criteria, and other similar search criteria may be used. An exemplary fully expanded hierarchy of search criteria is illustrated in FIGS. 5A and 5B. Portions of this hierarchy are visible in FIGS. 1 and 2. It is noted that the hierarchy may contain both story-based criteria and non story-based criteria. Examples of non-story based criteria include: availability on DVD, title, names of actors, name of Director, year released, length in minutes, name of production company, language spoken in the dialog, and/or the like.

Figure 3:
FIG. 3 illustrates an exemplary user interface during Step Two of an exemplary story-based media search system.

In accordance with various aspects of the present invention, a search system may utilize standard graphical user interface (GUI) components which commonly appear in software applications. Exemplary GUI components include radio buttons, checkboxes and sliders. Exemplary radio buttons, checkboxes and sliders are illustrated in FIG. 3.

Step Two

In accordance with one embodiment of the present invention the method comprises a Step Two in which the user determines how each criterion selected from Step One affects the database query and order of results returned by the query. With reference now to FIG. 3, an exemplary user interface for Step Two is illustrated. For each of the criteria selected in Step One in the previous example, the user is able to input three settings in Step Two. However, in various embodiments of the invention, each of these three settings may or may not be present in the user interface.

In one exemplary embodiment, the first setting accepts a max/min input from the user, whereby the user chooses one of two options: 1) searching for works that contain as much as possible of the identified quality, and 2) searching for works that contain as little as possible of the quality. In one example, the user interface comprises two radio buttons to receive the max/min input from the user. In the example in FIG. 3, the user has clicked on the radio button labeled "Romantic Behavior" to indicate a desire that a work contain as much romantic behavior as possible. If the user prefers that the work does not contain romantic behavior, then the user can click on the radio button labeled "Lack of Romantic Behavior".

In another exemplary embodiment, the user may input a second setting indicating whether the identified criterion limits the query results. This setting may be implemented using a checkbox. The user may place a check into the checkbox to indicate that the associated criterion limits the query results. Alternatively, the user may remove a check from the checkbox to indicate that the associated criterion does not limit the query results; i.e., the query returns all works that meet all of the checked criteria. In the example in FIG. 3, the query returns all works that contain Romantic Behavior and a Heroic Story. In another example, the user selects criteria A, B, C and D from the browse tree, then uses the radio buttons to indicate a desire for the minimum of C and maximum of A, B and D, and then checks the checkboxes of A and C. In this example, in Step Three the query may be configured to return all works that have characteristic A and do not have characteristic C.

The third setting may be configured to accept an importance input from the user. This input is used to determine how much the identified search criterion affects the order of the results returned by the query. The user interface may implement the importance input using a slider as in FIG. 3. The user can set the slider's value anywhere from zero, which indicates zero effect on the order of results, to ten, which indicates the maximum effect. Again, the numerical values of zero to ten are merely exemplary, and other ranges may be used.

In one embodiment, the user may leave any of the three settings at preset default values. When the user is finished inputting the values of settings for all the identified criteria, the user may click on the "Step 3" label in the left window to move onto Step Three.

Step Three

With reference now to FIG. 4, an exemplary user interface for Step Three is configured such that when the user enters Step Three, a right window pane contains only the "Execute Search" button and information appearing above this button. This information summarizes the user's selections from Step Two. In this example, the user has elected to search for works with Romantic Behavior and Heroic Story. For the ordering of the search results, the user placed the largest importance (10) on the amount of Romantic Behavior and lesser amounts (7 and 5) on Jealous Behavior and Heroic Story, respectively. After reviewing this information, the user provides an input to execute the query, such as clicking on a screen icon through use of a mouse. The results may be displayed to the user below the button. As described earlier, for each work the database may store the values of the characteristics of the works, e.g., amount of Romantic Behavior, on a scale from zero to ten. In one exemplary embodiment, the query returns all works that have Romantic Behavior greater than five (a threshold value) and Heroic Story greater than five. The threshold value may also be set at other suitable values.

Search Results

An exemplary embodiment of the present invention determines the order of search results by a computation as follows. Let n be the number of search criteria selected by the user. Each selected criterion has an importance setting that may be input by the user. $I_k$ is the value of the importance setting for the kth criterion; in one embodiment, $I_k$ is the value on the slider of the kth criterion, on the scale of zero to ten. $C_{kj}$ represents the number in the database (or based on data in the database) to indicate the amount in the jth work of the characteristic given by the kth criterion; $C_{kj}$ is between zero and ten. $S_{kj}$ is set equal to $C_{kj}$ if the user set the max/min input to indicate desire for as much as possible of the kth identified criterion. Otherwise, if the user set the max/min input to indicate desire for as little as possible of the criterion, then $S_{kj}$ is set equal to $(10-C_{kj})$. $S_{kj}$ is a score on the scale of zero to ten.

The jth work returned by the query has a total score, $T_j$, equal to a sum of criteria scores weighted by the importance levels. For example, $T_j=I_1S_{1j}+I_2S_{2j}+\ldots I_nS_{nj}$. In this equation, n=number of criteria identified by user; $I_k$=importance of kth criterion; $S_{kj}$=score of work j in kth criterion; and $T_j$=total score of work j. Thus, using $T_j$ the search results can be presented to the user in descending order of the total score for the work.

In the example in FIG. 4, $I_1$=10 for Romantic Behavior, $I_2$=7 for Jealous Behavior, and $I_3$=5 for Heroic Story. The total score of the work "Triumph of Love" is $T_1$=10(9)+7(8)+5(10)=196.

As illustrated in FIG. 4, the user interface may be within a Web Browser and links may be provided to other web pages related to the returned work. Thus, the underlining of text indicates a link to another web page. In exemplary embodiments, these links may be stored in the database and associated with their respective works. In other embodiments of the invention, the user interface might not appear in a web browser.

With reference to FIG. 4, in this example, the query returned only three works. For each of these works, the system may be configured to display a title, a link to an Information Sheet, the scores $S_{1j}$, $S_{2j}$, and $S_{3j}$, and suggested links for the user to follow. The Information Sheets may provide standard information such as credits, synopsis, year, and MPAA rating. The scores, $S_{1j}$, $S_{2j}$, and $S_{3j}$, are the amounts of the desired characteristics, which in this case are Romantic Behavior, Jealous Behavior and Heroic Story, on the scale of zero to ten.

In accordance with an embodiment of the present invention, the user interface may include suggested links for the user to follow in order to obtain more information about a work. With reference to FIG. 4, these suggested links may appear, for example, under the heading "Suggestions". These links may vary from one work to the next. For example, if the work is a film, then the interface may present a link to find a DVD only if the film has been released to DVD. The number and nature of the suggestion links may also depend on deals made with businesses such as film producers, theater chains, video stores, book publishers, and online retailers. The user may follow suggestion links to locate nearby movie theaters showing the film, locate nearby retailers of the book, DVD or VHS tape, locate libraries that include the work, visit web sites to buy the work online, view the movie trailer, visit the website of the movie, view an advertisement of the work, visit web sites that allow the user to download the work, and/or obtain some type of information or access to the work.

Hierarchal Search

With reference now to FIGS. 5A and 5B, an exemplary hierarchy of search criteria is described. Part of this hierarchy appears in the browse tree in FIGS. 1 and 2. In each of the four columns seen in FIGS. 5A and 5B, the names that begin at the left edge identify the criteria at the top of the hierarchy, that is, the child nodes of the root of the tree. The children of each node are listed below their parent, such that each child is on a row with one more leading tab than the row of its parent. An asterisk means that the node corresponds to a field in a table in an exemplary relational database; a double asterisk means that the node corresponds to a table in the database. In an exemplary embodiment, a node can be identified by its path name in the hierarchy. For example, the path name "Themes/Political/Oppression" identifies the Oppression node, which is a child of the Political node, which is a child of the Themes node at the top of the hierarchy.

When the user selects multiple nodes in the hierarchy of search criteria in Step One, then these selections are normally treated independently. This may be true even if one selected node is a child or descendent of another selected node. For example, suppose the user selected the two nodes Genres/Comedy and Genres/Comedy/Slapstick. In an exemplary embodiment, the user interface and algorithms in Step Two and Step Three would be the same as if these nodes were not related. In the exemplary interface in Step Two the user would see two radio buttons, one checkbox and one slider for Genres/Comedy, and he would see the same controls for Genres/Comedy/Slapstick. However, descendents of the "Characters" and "Relationships" nodes are not necessarily treated independently of other such descendents.

Although the methods and systems of the invention are described in various exemplary embodiments herein as a browse tree with a root, leaf nodes and expandable and collapsible branches, other methods of presenting search criteria may also be used within the scope of the present invention. The format and graphical display of the browse tree may be implemented in other suitable ways. Furthermore, various hierarchal and non-hierarchal structures may be used to facilitate searching for and selection of story-based criteria. In addition, the content of the search criteria in the browse tree may be varied to facilitate identification of desired story-based criteria. For example, the exemplary hierarchy in FIGS. 5A and 5B contain a Relationships node with children named "Attraction", "Family", and "Friendship". Any of these nodes or their children may or may not be present in a hierarchy of search criteria. Moreover, the Relationships node may have additional children. For example, the Relationships node may have a child named "Office Relationships", which may have children named "Boss-Subordinate", "Coworkers", "Sexual Harassment", "Close Working Relationship" and/or the like.

Nevertheless, the story-based criteria will comprise at least one and often many of the story-based criteria identified in FIGS. 5A and 5B, regardless of the structure used to facilitate the search for those criteria. Thus, in accordance with various aspects of the present invention, at least one story characteristic is presented and/or used as a search criterion. For example, the hierarchy shown in FIGS. 5A and 5B has nine nodes at the top. Six of these nodes are story characteristics: Characters, Dramatic Behaviors, Genres, Psychological Factors, Relationships and Themes. The remaining three top nodes, Availability, Credits and Other, are smaller categories that cover various features unrelated to story.

Within the Hierarchy, each criterion name may have a definition. The user might view the definition by taking a specific action, such as a right-button click on the mouse when the pointer is over the criterion name. Criteria names and definition should tend to conform to the following guidelines.

(1) Clarity. The definition should be unambiguous and not too vague.

(2) Objectivity. A human reviewer may experience the work, e.g., watch the film, and assign a score (e.g., on a scale of 0 to 10) to the degree of match with the search criterion. The criterion definition should be tailored to reduce subjectivity in scoring.

(3) Expectation of Meaning. The definition should reasonably conform to the user's prior expectation of the meaning of the criterion name.

Perfect conformity with these guidelines is not necessary or normal in the invention. For example, the search criteria should cover story characteristics that people desire. Many of these characteristics are difficult to define clearly and score objectively. Moreover, in defining a criterion, any of the three guidelines may have to be compromised in an effort to meet the other two guidelines.

The Database

The database of the present invention may be a relational database. Tables 1A through 1G contain the structure of part of an exemplary relational database that may be used in implementing the invention. Each of these tables describes an exemplary structure of one of the database tables. Each of Tables 1A through 1G lists the name, data type and description of each field in exemplary tables in the relational database. For example, Table 1C illustrates the structure of an exemplary Films table. In the Films table, the first column (named "filmID") may contain the key, i.e., ID number of each film. The second column (named "title") may contain the film titles, which are text strings. The fifth column (named "numCharacters") is configured to contain the number of characters in each film. The numCharacters column is configured to contain integers. Note that numCharacters is the number of characters stored in the table named "Characters", for a particular film. Table 1A illustrates an exemplary structure of the Characters table.

TABLE 1A

Structure of table of Characters:

| Field Name | Data Type | Description |
| --- | --- | --- |
| filmID | key | Primary key in Films table |
| charID | key | A primary key for this table. Varies from 1 to number of characters in the film identified by filmID. |
| charName | text | Character's name as given in the film's credits |
| actorName | text | Name of actor who plays this character |
| rank | integer | Varies from 1 (most important character in film) to number of characters in film. |
| ageCatagory | text | Characters/Character X/Age |
| hero | score | Characters/Character X/Hero |
| becomesHero | score | Characters/Character X/Hero/Becomes Hero |
| flawedHero | score | Characters/Character X/Hero/Flawed Hero |
| strongHero | score | Characters/Character X/Hero/Strong Hero |
| homemaker | score | Characters/Character X/Occupation/Homemaker |
| paidOccupation | score | Characters/Character X/Occupation/Paid Occupation |
| blueCollar | score | Characters/Character X/Occupation/Paid Occupation/Blue Collar |
| technical | score | Characters/Character X/Occupation/Paid Occupation/Technical |
| entrepreneur | score | Characters/Character X/Occupation/Paid Occupation/Entrepreneur |
| executive | score | Characters/Character X/Occupation/Paid Occupation/Executive |
| gov | score | Characters/Character X/Occupation/Paid Occupation/Gov |
| judge | score | Characters/Character X/Occupation/Paid Occupation/Gov/Judge |
| military | score | Characters/Character X/Occupation/Paid Occupation/Gov/Military |
| govOther | score | Characters/Character X/Occupation/Paid Occupation/Gov/Other |
| police | score | Characters/Character X/Occupation/Paid Occupation/Gov/Police |
| politician | score | Characters/Character X/Occupation/Paid Occupation.Gov/Politician |
| lawyer | score | Characters/Character X/Occupation/Paid Occupation/Lawyer |
| medical | score | Characters/Character X/Occupation/Paid Occupation/Medical |
| scientist | score | Characters/Character X/Occupation/Paid Occupation/Scientist |
| teacher | score | Characters/Character X/Occupation/Paid Occupation/Teacher |
| retired | score | Characters/Character X/Occupation/Retired |
| student | score | Characters/Character X/Occupation/Student |
| unemployed | score | Characters/Character X/Occupation/Unemployed |
| volunteer | score | Characters/Character X/Occupation/Volunteer Work |
| bold | score | Characters/Character X/Personality/Bold |
| devious | score | Characters/Character X/Personality/Devious |
| flirtatous | score | Characters/Character X/Personality/Flirtatous |
| friendly | score | Characters/Character X/Personality/Friendly |
| sarcastic | score | Characters/Character X/Personality/Sarcastic |
| strongWilled | score | Characters/Character X/Personality/Strong-Willed |
| tempermental | score | Characters/Character X/Personality/Temperamental |
| troubled | score | Characters/Character X/Personality/Troubled |
| negative | score | Characters/Character X/Portrayal/Negative |
| neutral | score | Characters/Character X/Portrayal/Neutral |
| positive | score | Characters/Character X/Portrayal/Positive |
| sex | text | Characters/Character X/Sex |

In FIGS. 5A and 5B some of the nodes in the hierarchy are followed by a single asterisk. The asterisk signifies that the node corresponds to a field in a table in the exemplary relational database. The field may be configured to store the data for the characteristic named by the node. For example, the node with path name "Genres/Comedy/Situation Comedy" has an asterisk in FIG. 5A. With reference to Table 1C, the Films table has a field named "sitCom" that is configured to store the degree to which each film falls within the Situation Comedy genre. In Table 1C the data type of the sitCom field is "score".

TABLE 1C

Structure of table of Films:

| Field Name | Data Type | Description |
|---|---|---|
| filmID | key | Primary key for this table. |
| title | text | title of film |
| synopsis | text | synopsis of film |
| infoPointer | text | some type of pointer to some information to show in Step 3 |
| numCharacters | integer | number of this film's characters listed in Characters table |
| dvd | score | 10 if DVD available; 0 otherwise |
| internetDownload | score | 10 if can download via Internet; 0 otherwise |
| inTheater | score | 10 if available in movie theaters; 0 otherwise |
| onBroadcast | score | 10 if available as TV broadcast; 0 otherwise |
| on CableTV | score | 10 if available over cable TV; 0 otherwise |
| onPayPerView | score | 10 if available as cable pay-per-view; 0 otherwise |
| vhs | score | 10 if VHS tape avaliable; 0 otherwise |
| anger | score | Dramatic Behaviors/Anger |
| emotionallyHurt | score | Dramatic Behaviors/Emotionally Hurt |
| crying | score | Dramatic Behaviors/Crying |
| romanceBehavior | score | Dramatic Behaviors/Romance |
| expressionLove | score | Dramatic Behaviors/Expression of Love |
| deceit | score | Dramatic Behaviors/Deceit |
| jealousy | score | Dramatic Behaviors/Jealousy |
| inspiration | score | Dramatic Behaviors/Inspiration |
| action | score | Genres/Action |
| crimePolice | score | Genres/Action/Crime-Police |
| warMovie | score | Genres/Action/War Movie |
| secretAgent | score | Genres/Action/Secret Agent |
| sports | score | Genres/ Action/Sports |
| childrens | score | Genres/Children's |
| comedy | score | Genres/Comedy |
| slapstick | score | Genres/Comedy/Slapstick |
| spoofSatire | score | Genres/Comedy/Spoof-Satire |
| dryHumor | score | Genres/Comedy/Dry Humor |
| unconvenBahavior | score | Genres/Comedy/Unconventional Behavior |
| sitCom | score | Genres/Comedy/Situation Comedy |
| dramaGenre | score | Genres/Drama |
| loveStory | score | Genres/Drama/Love Story |
| fantasy | score | Genres/Fantasy |
| horror | score | Genres/Horror |
| messageGenre | score | Genres/Message Emphasized |
| periodPiece | score | Genres/Period Piece |
| western | score | Genres/Period Piece/Western |
| romanticComedy | score | Genres/Romantic Comedy |
| scienceFiction | score | Genres/Science Fiction |
| trueStory | score | Genres/True Story |
| animated | score | Other/Animated |
| color | score | Other/Color |
| dubbedLangID | foreign key | Other/Language/Dubbed |
| originalLangID | foreign key | Other/Language/Original |
| subtitledLangID | foreign key | Other/Language/Subtitled |
| length | integer | Other/Length |
| majorRelease | score | Other/Major Release |
| mpaaWarnings | text | Other/MPAA Ratings/Content Warnings. This field contains list of warning codes for this film. |
| mpaaRatingID | foreign key | Other/MPAA Ratings/Overall Rating |
| yearReleased | integer | Other/Year Released |
| heroicFactor | score | Psychological Factors/Heroic |
| positiveEnding | score | Psychological Factors/Ending/Positive |
| tragedyEnding | score | Psychological Factors/Ending/Tragedy |
| forceFactor | score | Psychological Factors/Force |
| romanceFactor | score | Psychological Factors/Romance |
| sexFactor | score | Psychological Factors/Sex |
| sexualInteractions | score | Psychological Factors/Sex/Sexual Interactions |
| sexualRelationships | score | Psychological Factors/Sex/Sexual Relationships |
| sexyFemales | score | Psychological Factors/Sex/Sexy Females |
| sexyMales | score | Psychological Factors/Sex/Sexy Males |
| darkTone | score | Psychological Factors/Tone/Dark |

TABLE 1C-continued

Structure of table of Films:

| Field Name | Data Type | Description |
| --- | --- | --- |
| lightTone | score | Psychological Factors/Tone/Light |
| violence | score | Psychological Factors/Violence |
| graphicViolence | score | Psychological Factors/Violence/Graphic |
| nonGraphicViolence | score | Psychological Factors/Violence/Not Graphic |
| collectiveIdentity | score | Themes/Collective Identity |
| collectivism | score | Themes/Collective Identity/Collectivism |
| community | score | Themes/Collective Identity/Community |
| nationalIdentity | score | Themes/Collective Identity/National Identity |
| otherCollective | score | Themes/Collective Identity/Other Groups |
| environmentalism | score | Themes/Environmentalism |
| ethics | score | Themes/Ethics |
| businessEthics | score | Themes/Ethics/In Business |
| publicEthics | score | Themes/Ethics/In Public Life |
| relationsEthics | score | Themes/Ethics/In Personal Relations |
| profEthics | score | Themes/Ethics/In Professions |
| academicEthics | score | Themes/Ethics/In Academia |
| individualism | score | Themes/Individualism |
| qwest | score | Themes/Personal Qwest |
| heroQuest | score | Themes/Personal Qwest/Heroism |
| highMot | score | Themes/Personal Qwest/Motivational Level/High |
| inadaquateMot | score | Themes/Personal Qwest/Motivational Level/Inadequate |
| increasedMot | score | Themes/Personal Qwest/Motivational Level/Increased |
| businessGoal | score | Themes/Personal Qwest/Objectives/Business |
| independenceGoal | score | Themes/Personal Qwest/Objectives/Independence |
| intellectualGoal | score | Themes/Personal Qwest/Objectives/Intellectual |
| politicalGoal | score | Themes/Personal Qwest/Objectives/Political |
| relationshipGoal | score | Themes/Personal Qwest/Objectives/Relationships |
| spiritualGoal | score | Themes/Personal Qwest/Objectives/Spirirual |
| optimism | score | Themes/Personal Qwest/Optimism |
| pessimism | score | Themes/Personal Qwest/Pessimism |
| realism | score | Themes/Personal Qwest/Realism |
| politicalTheme | score | Themes/Political/ |
| equality | score | Themes/Political/Equality |
| freedom | score | Themes/Political/Freedom |
| socialIssue | score | Themes/Political/Issues/Social |
| economicIssue | score | Themes/Political/Issues/Economic |
| internationalIssue | score | Themes/Political/Issues/International |
| natureOfGov | score | Themes/Political/Nature of Government |
| oppression | score | Themes/Political/Oppression |
| politics | score | Themes/Political/Politics |
| conservativeView | score | Themes/Political/Viewpoints/Conservative |
| liberalView | score | Themes/Political/Viewpoints/Liberal |
| warIssue | score | Themes/Political/War |
| religion | score | Themes/Religion |
| religiousTeachings | score | Themes/Religion/Religious Teachings |
| agnostic | score | Themes/Religion/Viewpoints/Agnostic-Atheist |
| faithInGod | score | Themes/Religion/Viewpoints/Faith in God |
| religiousFreedom | score | Themes/Religion/Freedom of Religion |
| socialTheme | score | Themes/Social |
| genderTheme | score | Themes/Social/Gender Relations |
| familyTheme | score | Themes/Social/Family Issues |
| friendshipTheme | score | Themes/Social/Friendship |
| racialTheme | score | Themes/Social/Racial Issues |
| rebellionTheme | score | Themes/Social/Rebellion |
| nonconformTheme | score | Themes/Social/Nonconformist |
| sexTheme | score | Themes/Social/Sex |
| loveTheme | score | Themes/Social/Love |
| alienationTheme | score | Themes/Social/Alienation |
| popularityTheme | score | Themes/Social/Popularity |
| truthTheme | score | Themes/Truth |

In one exemplary embodiment, a score may be a number between zero and ten to indicate the degree to which a work or entity has the given characteristic. In FIG. 5A the Credits node has a double asterisk, "**", because the relational database stores the credits in a table, rather than just a field in a table.

In this particular exemplary database, all the works are films. The Films table has more fields than the other tables. Some other major tables are the Characters table, with an exemplary structure illustrated in Table 1A, and the Relationships table, with an exemplary structure illustrated in Table 1G.

TABLE 1G

Structure of table of Relationships:

| Field Name | Data Type | Description |
|---|---|---|
| filmID | key | Primary key in Films table |
| charID1 | key | A primary key in this table. The relationship is between the characters with ID's charID1 & charID2 from Characters table. |
| charID2 | key | The remaining primary key in this table. |
| attraction | score | Relationships/Attraction |
| casual | score | Relationships/Attraction/Casual |
| dating | score | Relationships/Attraction/Dating |
| longTerm | score | Relationships/Attraction/Long-Term Relationship |
| loveAffair | score | Relationships/Attraction/Love Affair |
| unfulfilled | score | Relationships/Attraction/Unfulfilled Desire |
| fatherDaughter | score | Relationships/Family/Father-Daughter |
| fatherSon | score | Relationships/Family/Father-Son |
| grandparent | score | Relationships/Family/Grandparent |
| husbandWife | score | Relationships/Family/Husband-Wife |
| motherDaughter | score | Relationships/Family/Mother-Daughter |
| motherSon | score | Relationships/Family/Mother-Son |
| sibling | score | Relationships/Family/Sibling |
| familyOther | score | Relationships/Family/Other |
| friendship | score | Relationships/Friendship |

The Characters table may be configured to store the characteristics of the major characters in the films. The Relationships table may be configured to store the characteristics of the major relationships between the major characters in the films.

Tables 1A through 1G may be modified and/or added to as appropriate to accomplish the same functions and/or additional functions. Furthermore, additional tables may be created to suitably facilitate similar and/or additional functions. Moreover, other database designs may be used in various exemplary embodiments of the present invention.

The system may be configured to process subjective scores. For example, the database may be configured to process scores that result from computations based on raw scores assigned by multiple human reviewers. The database may store the raw scores and indicate the method of computation of each final score. Tables 1A through 1G only illustrate tables with the final scores.

In accordance with another exemplary embodiment, the system is configured to display, for each search result, links for finding theaters, finding DVD retailers, or taking some other action to learn more about or view the film or work. See, for example, FIG. 4. In exemplary embodiments, the database and/or system are configured to support the display of the appropriate links for each film and take appropriate action when the user clicks on one of these links.

Table 1B illustrates the structure of an exemplary Credits table.

TABLE 1B

Structure of table of Credits:

| Field Name | Data Type | Description |
|---|---|---|
| filmID | key | Primary key in Films table |
| creditID | key | A primary key for this table. Varies from 1 to number of credits in the film identified by filmID. |

TABLE 1B-continued

Structure of table of Credits:

| Field Name | Data Type | Description |
|---|---|---|
| catagory | text | one of "actor", "director", "crew", etc . . . |
| creditText | text | text of the credit, e.g., "Starring Julia Roberts" |
| nameCredited | text | name of person or company, e.g., "Julia Roberts" |
| charID | key | If this is an acting credit and the character is listed in the Characters table, then this field is the charID key from the Characters table. Otherwise, charID in Credits table is zero. |

This table supports the following type of search for a credit. In Step One of the user interface, the user selects a credits category such as "Actors". In Step Two, the user sees the search panel with two radio buttons, one checkbox and one slider as in FIG. 3, but the panel also contains a text input field. The user enters the name of an actor, e.g., "Julia Roberts" into the text field. In Step Three, the application searches for a work in which Julia Roberts has an acting credit in which her name is spelled exactly as typed in by the user, i.e., "Julia Roberts". If the credit included Julia Robert's middle name, then the application would not recognize that the credit matches the user's intention. Other exemplary databases may be further configured to recognize credits (or other input) that are not spelled exactly as input by the user.

The Tables 1A through 1G illustrate exemplary concepts of and ways to implement the invention. However, other database structures may also be used to implement the invention, for example as shown below in Tables 1D, 1E and 1F.

TABLE 1D

Structure of table of Languages:

| Field Name | Data Type | Description |
|---|---|---|
| langID | key | the primary key for this table |
| langName | text | name of language |

Character Searches

The browse tree, with reference now to FIGS. 5A and 5B, may comprise major nodes named "Characters" and "Relationships". The user may desire that a work contains some character type with multiple specific qualities. Furthermore, the user may wish to define multiple desired characters types, each of which has multiple specific qualities. In accordance with an exemplary embodiment of the invention, the system is configured to facilitate the user's search for works having one or more character types, where each character type has one or more specified qualities.

Within the database, there is a list of major characters in each work. For each character, the database may store the values of certain qualities of the character on the scale of zero to ten. Within the browse tree of search criteria, the "Characters" node has children named "Character A", "Character B", "Character C" and "Character D", as illustrated in FIG. 5A. For each of these four character nodes, if the user expands the node and expands all of its children and descendents, then the user uncovers the same subtree as under Character A in FIG. 5A. In this subtree the nodes are qualities that a character type may possess. For each of up to four character types, the user may select multiple desired qualities from the subtree of that character type. Character types A, B, C and D correspond to different characters in the same work. In Step Two, each selected quality of each character may present the same type of user interface (two radio buttons, one checkbox and one slider) as earlier described and illustrated in FIG. 3.

With respect to a work in the database, a "character mapping" matches each character type specified by the user, e.g., Character A, to a specific character in the work. For each of the character types A, B, C and D identified by the user, the character type maps to a different character in the work. Suppose a work has five characters identified in the database as characters 1 through 5. Suppose the user selected qualities of Character types A, B, and C in Step One. One possible mapping would say that Character A is character 3, B is character 2, and C is character 5. A work is returned by the query in Step Three if and only if there exists at least one character mapping such that each character type maps to a character that has all the qualities for which the user checked the checkbox in Step Two. The query results are displayed in the order of their total score, as described earlier. But a work may have more than one character mapping that satisfies the query. Therefore, in an exemplary embodiment a character mapping is found that maximizes the total score of the work. This mapping determines the total score to be used in ordering the query results.

A special case arises when the number of characters in a work is less than the number of character types specified by the user. Suppose the user specifies qualities of n character types (where n<=4 if the available character types are Characters A, B, C and D) and a work has m characters in the database. Suppose that m<n. Then each character mapping maps m of the character types to actual characters in the work, and maps n-m of the character types to null characters, i.e., characters that do not exist in the work. For example, suppose the user has specified qualities of the four character types A, B, C and D and a work has only two characters which are character 1 and character 2. In one possible mapping, Character B maps to character 1, Character C maps to character 2, and Characters A and D each map to the null character.

In one exemplary embodiment, a null character cannot fulfill a condition for return of a work by the query. If the user checked a checkbox for a quality of Character A, and A maps to the null character in a particular mapping, then this mapping may not fulfill the conditions for returning the work by the query. Also, all of a null character's qualities (selected by the user in Steps 1 and 2) may receive a zero score for purposes of ordering the works displayed to the user in Step 3.

Relationship and Character Searches

The invention also facilitates searches for relationships between characters. The user may specify multiple relationships, each having multiple desired qualities. The user can specify desired qualities of each character in a specified relationship. Or the user can elect not to specify any desired qualities of a character in a specified relationship. In the following example, the user searches for three character types and a relationship between two of them, in accordance with an exemplary embodiment of the invention. The user begins by interacting with the exemplary interface in FIG. 1. The user expands the "Characters" and "Relationships" parts of the browse tree. As seen in FIG. 5B, the user is able to specify separate relationships identified as "Relationship 1" and "Relationship 2". For each relationship, the user may click on one or more nodes under that relationship to select the desired qualities of the relationship. Suppose the user selects from the browse tree the five nodes with the following path names.

(1) Characters/Character A/Age/Senior
(2) Characters/Character A/Portrayal/Positive
(3) Characters/Character B/Personality/Bold
(4) Relationships/Relationship 1/Attraction/Love Affair
(5) Relationships/Relationship 1/Attraction/Casual In one exemplary embodiment, after the user selects one of the nodes which is a descendent of the "Relationships/Relationship 1" node, the application may present a pop-up dialog box like that in FIG. 6. If the user had also selected a node under "Relationship 2", then the user would also receive a separate, identical pop-up dialog box for Relationship 2. In FIG. 6 the user selects the two character types in Relationship 1. Each character type can be one of A, B, C, or D. When the user clicks on one of the little triangles in FIG. 6, a menu pops-up with the choices: "Character A", "Character B", "Character C", and "Character D". When the user selects from the menu, it then disappears and the selected character appears in the box left of the little triangle. As seen in FIG. 6, the user decided that Relationship 1 is to be a relationship between characters types B and C.

For each of character types A, B, C, and D, the character type is said to be "specified" if the user has selected one or more qualities of this character type by, for example, clicking on tree nodes under this character type. In the example, Character B is specified because the user selected the node with path name "Characters/Character B/Personality/Bold". Character A is specified because the user selected two qualities of Character A. Characters C and D are unspecified. Each of character types A, B, C, and D, is said to be "referenced" if it is one of the characters in Relationship 1 or Relationship 2. The user may reference characters by, for example, using the dialog box of FIG. 6. In the example, Characters B and C are referenced by Relationship 1. Character A is specified but not referenced. Character D is unspecified and unreferenced.

Figure 7A:
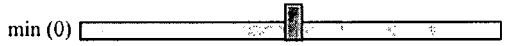

Step Two in Relationship and Character Search:

In the example, after completing Step 1 with the extra pop-up dialog box, the user moves on to Step Two. FIGS. 7A and 7B illustrate an exemplary user interface for Step Two; FIG. 7A illustrates the upper part of the screen and FIG. 7B illustrates the lower part of the same screen. This exemplary Step Two interface has the same elements as the interface in FIG. 3, where the search did not involve characters or relationships. For each of the five search criteria selected in Step One, the exemplary interface contains a panel with the two radio buttons, one checkbox, and one slider. For the criterion "Relationship 1/Attraction/Casual", the user clicked a radio button to indicate a desire that Relationship 1 does not include a casual attraction. In this example, the user is looking for a work in which: 1) a bold character (Character B) has a relationship with some other character (Character C), which relationship includes a love affair and does not include a casual attraction, and 2) a third character (Character A) is a senior portrayed in a positive way. The checkboxes may determine which works are retrieved from the database. The query retrieves all works in which: 1) a bold character has a love affair with some other character, and 2) a third character is a senior. The order of the retrieved works is, in this exemplary embodiment, affected equally by all five search criteria, because each slider in this example is set at the same value of five on the scale of zero to ten.

Step Three in Relationship and Character Search:

In an exemplary Step Three, the user clicks the button labeled "Execute Search", and views the results. The exemplary Step Three interface looks the same as for the earlier search that did not involve characters and relationships. As seen in Tables 1A through 1G, for each film the database may store a number of major characters and major relationships between those characters. But any two major characters of the same work in the Characters table may or may not have a major relationship stored in the Relationships table. Two characters in a work might not have a relationship, or they may have a relationship that is not important enough to be in the database. In a character mapping of a work, each of the character types, A, B, C, and D, maps to a character (or to the null character) in the work, if this character type is specified or referenced. If a character type A, B, C, or D is unspecified and unreferenced, then it does not map to any character in a work (nor to the null character). Returning to the exemplary search, each character mapping maps Character types A, B and C to characters (or null characters) in a work. This is because Character type A is specified, Character type B is specified and referenced by Relationship 1, and Character type C is referenced by Relationship 1. The unspecified, unreferenced Character type D is not included in mappings.

In an exemplary embodiment of the invention, a work in the database is returned by the query if and only if there is at least one character mapping such that all of certain conditions are met. For each mapping, in this exemplary embodiment, there are the following conditions to return the work. For each character or relationship checkbox that is checked in Step Two, the user is creating the condition that the indicated character or relationship has the indicated quality. (A null character has no qualities. A relationship has no qualities if one or both of its characters are null.) In addition, there may exist a condition that a relationship exists between two characters. If the user prescribed a relationship with n prescribed qualities, then the Step Two interface may present n checkboxes for this relationship. If the user checked at least one of these n checkboxes, then there exists the condition that the database's Relationships table contains a relationship between the indicated characters. In the above example, Character A is a senior, while Character B is a bold character having a relationship with Character C. Suppose that a work has five characters. The database may identify them as Characters 1 through 5. This work has 60 different character mappings. In one mapping, Character A is Character 5, Character B is Character 2, and C is 4. For this mapping, there are the conditions that character 5 is a senior and character 2 is bold. For Relationship 1 between Character B (which is character 2) and Character C (which is character 4), the user had two available checkboxes. The user checked the checkbox for a love affair, but did not check the checkbox for lack of casual attraction. Since the user checked at least one of these checkboxes, there is the condition that the Relationships table contains a relationship between character 2 and character 4. There is also the condition that this relationship includes a love affair.

| Algorithm for Order of Results |
| --- |

```
001  For each film
002  {
003      gen_subtotal = 0
004      For each general criterion
005      {
006          Let score = this film's score for this criterion.
007          Let weight = weight of this criterion.
008          gen_subtotal = gen_subtotal + weight * score
009      }
010
011      char_subtotal = 0
012      For each character mapping of this film
013      {
014          map_total = 0
015          For each non-null character type specified by user
016          {
017              For each of this character type's qualities desired
018              {
019                  Let score = score for this quality of this character
020                  in this film.
021
022                  Let weight = weight for this quality of this character.
023                  map_subtotal = map_subtotal + weight * score
024              }
025          }
026          For each relationship desired by user
027          {
028              Let c1 and c2 be the character types in this relationship.
029              If c1 and c2 have a relationship in the Relationships
030              table and c1 is not null and c2 is not null, then
031              {
032                  For each of this relationship's qualities desired
033                  {
034                      Let score = score for this quality of this
035                      relationship in this film.
036
037                      Let weight = weight for this quality of
038                      this relationship.
039                      map_subtotal = map_subtotal + weight * score
040                  }
041              }
042          }
043
044          If map_total > char_subtotal, then
045          {
046              char_subtotal = map_total
047          }
048      }
```

-continued

Algorithm for Order of Results

```
049      total_score = char_subtotal + gen_subtotal
050        Assign total_score to be the total score of this film.
051      }
052
053      Sort the films in descending order of total score.
054
055      For each film in descending order of total score
056      {
057        Print this film's information to a file or screen.
058      }
```

In accordance with various exemplary embodiments of the present invention, the above pseudo code defines a method of ordering the list of works returned by the query. The works may be ordered according to a score that measures how well a work satisfies the interests indicated by the user.

In line 1 of the listing of pseudo code, "For each film" means each film or work returned by the query. The algorithm is the same for films, books or other works. The total score for a film is the sum of 1) the "char_subtotal" variable, which is the subtotal for character and relationship qualities, and 2) the "gen_subtotal" variable, which is the subtotal for all other qualities of the film. On line 4, "For each general criterion" means for each quality that is not a quality of a character or relationship. The score on line 6 comes from the database and may come directly from the Films table. The weights on lines 7, 22 and 37 come from the importance inputs in Step Two of the user interface. On lines 11 through 48, the algorithm computes a maximum score over all possible character mappings for the film. With regard to line 17, the user indicated his/her desired qualities of characters using the browse tree and radio buttons in Step One and Step Two of the user interface.

The score on line 19 comes from the Characters table in the database. With regard to line 28, the character types c1 and c2 were selected by the user as illustrated in FIG. 6. With regard to line 32, the user indicated his/her desired qualities of relationships using the browse tree and radio buttons in Step One and Step Two of the user interface. The score on line 34 comes from the Relationships table in the database. On line 57, the algorithm may display information in a format like that appearing below the heading "Results" in FIG. 4.

Technologies and Tools for Implementation of Exemplary Embodiments of the Invention General purpose computers may serve as hosts of the present software invention. But the invention may also operate on a television system, in-store kiosk, home theater system, mobile device, or some other hardware platform. The invention can be implemented as an Internet application. The application logic and database may operate on a server. On the user's local computer, the user interface might be implemented in one of the following two ways.

(1) The interface can be within the user's web browser, in which case the application is an interactive web site. Interactivity can be implemented using a technology such as Active Server Pages (ASP), Personal Home Pages (PHP), JAVA Servlet/JAVA Server Pages (JSP), or Common Gateway Interface (CGI), or others. In the browser, the user interface may be a little different from that in FIG. 1 through FIG. 3, but these differences do not alter the nature of the invention.

(2) On the user's computer, the user can install a client program of the application. The client program may operate the user interface and communicate with the server program over the Internet using Transmission Control Protocol/Internet Protocol (TCP/IP). The client may be written, for example, in the JAVA language using Swing/Abstract Windows Toolkit (AWT) packages for the graphical user interface. For information on programming a browse tree in JAVA, see the book titled "Core JAVA 2: Volume II—Advanced Features", by Horstmann and Cornell, pages 319-358.

If the user interface operates inside a web browser, then the choice of interaction technology (e.g., ASP, PHP, JAVA Servlet/JSP or Common Gateway Interface) may determine the language in which to write the server-side program. In some other embodiments, the server-side program would be written in a language that supports TCP/IP socket communications and operations on a relational database. Such support exists in languages such as JAVA, C, C++, C#, and other procedural languages.

Additional Exemplary Embodiments

The methods and systems may be further configured to include or facilitate additional features. For example, the system may be configured to allow the user to specify characters and relationships in a graphical way. By way of example, the GUI may be configured to present icons that represent characters, e.g., Characters A, B, C and D. By double-clicking on a character's icon, the user may open a dialog box in which to select the desired qualities of this character. The dialog box may use the hierarchal system discussed herein. The system and method may be further configured such that the user may draw lines between characters to create relationships. By double-clicking on the line representing a relationship, the user may open a dialog box in which to select the desired qualities of this relationship.

In accordance with another exemplary embodiment, the user may search for story-based criterion by typing words, phrases or sentences in a text entry box to identify or search for story-based criterion that are of interest. For example, the user might type in a list of desired qualities and/or the user may type sentences about characters and relationships. The application may be configured to analyze the entered text and estimate which of the available search criteria hold the most interest to this user.

In accordance with another exemplary embodiment, if the application learns that a particular user purchased, viewed or read a particular list of works, then the application can estimate what qualities the user likes. Thus, the application may suggest to this user that the user conduct a search based on these qualities.

In accordance with another exemplary embodiment, if the user conducts a search, but the database contains no works that meet the conditions selected by the user, then the application may suggest that the user eliminate some conditions.

In accordance with another exemplary embodiment, the application may gather statistics about the selections made by the users in Steps One and Two over a period of time. Film producers and book publishers may be interested in these statistics for marketing purposes.

In another embodiment, the application may offer access to films or books for a fee. For example, the application may offer to download films or electronic books to the user's local computer.

In accordance with another exemplary embodiment, when a search locates a desired work, the application may offer the user the opportunity to communicate about the work to another person. For example, with user permission the application may send email to a friend of the user. The email may tell the friend about the work and/or allow the friend to use the application to repeat or modify the original search.

In another embodiment, schedule criteria may be added to the browse tree in FIGS. 5A and 5B. For example, the user may want to search for television programs that will be broadcast during time periods specified by the user.

Many things have been explained using examples. Many aspects of the user interface, browse tree, database design and other features can be changed without altering the fundamental nature of the invention.

Exemplary Story-Based Media Search System

Figure 8:
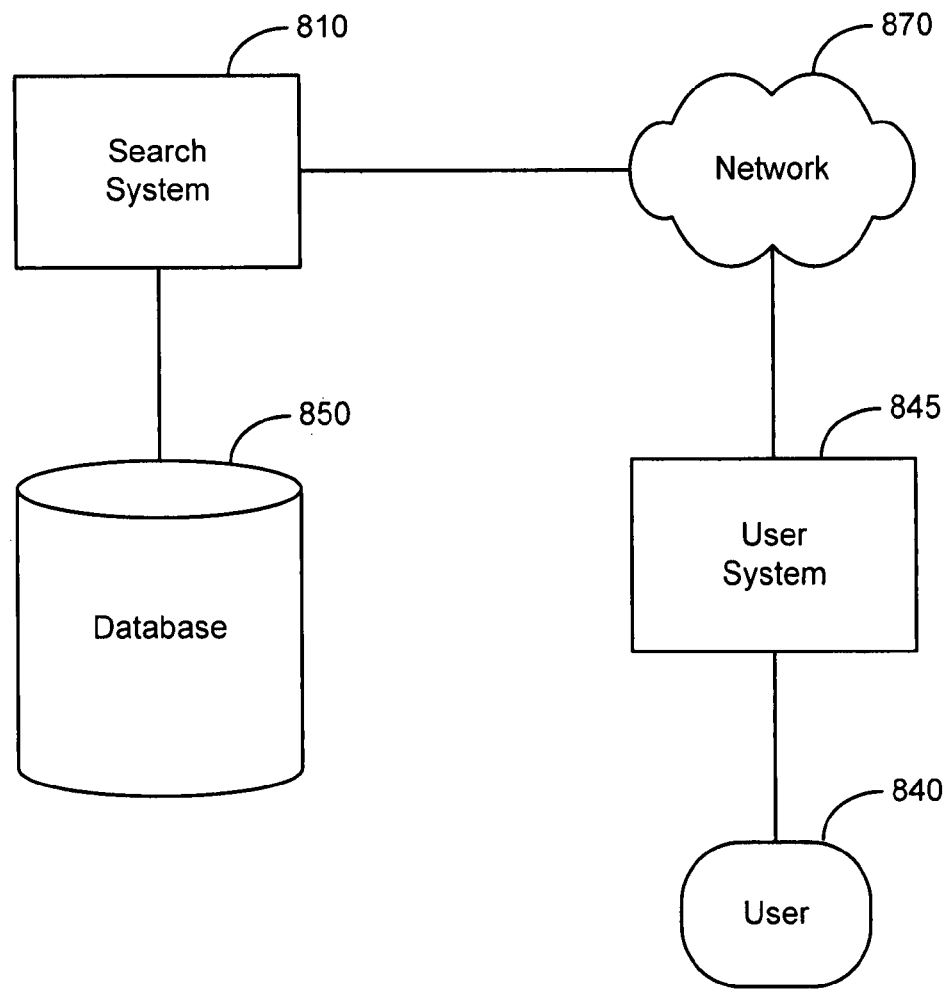
FIG. 8 illustrates a block diagram of an exemplary story-based media search system.

An exemplary system configuration may include, with reference to FIG. 8, a story-based media search system 800, which comprises a search system 810, a user system 845, and a network 870. Story-based media search system 800 may further comprise a database 850. Search system 810 may be any software and/or hardware, which facilitates a user 840 in searching for story-based media. User 840 may access search system 810 via a user system 845. Thus, search system 810 may be suitably configured to communicate with user 840 via user system 845. In these examples, communications between any of these components may take place in various manners, for example, via a network 870, or via other modes of communication discussed herein or known in the art.

The systems and/or components of the systems discussed herein may also include one or more host servers or other computing systems including a processor suitably configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including relational, hierarchical, or other types of data that could be used in association with the invention. As those skilled in the art may appreciate, a computer may also include an operating system (e.g., WINDOWS NT, 95/98/2000, WINDOWS XP, LINUX, SOLARIS, etc.) as well as various conventional support software and drivers typically associated with computers.

In one exemplary embodiment of the invention, story-based media search system 800 is suitably configured to facilitate searches for works based on story-based search criteria.

Search System 810

In general, search system 810 is configured to communicate with user system 845 in connection with the search for story-based media. The information communicated may vary depending on the user's interest in story-based media. In one exemplary embodiment, search system 810 comprises hardware and/or software. Search system 810 may have a computing center such as a mainframe computer. However, the computing center of search system 810 may be implemented in other forms, such as a personal computer, a mini-computer, a PC server, a network set of computers, embedded processors or the like.

In accordance with various exemplary embodiments, search system 810 is suitably configured to receive input from a user identifying and further defining search criteria for searching for works based on story-based criteria. Search system 810 is suitably configured to process the input and identify works that most closely satisfy the search criteria provided by the user. Search system 810 is further suitably configured to provide output information communicating the results of the search.

Search system 810 may include any software, hardware, and/or the like that is capable of searching for story-based media. Furthermore, search system 810 may include an internet accessible web site configured to receive user inputs and react as described herein. In one exemplary embodiment, search system 810 may be further configured with an interactive voice response system ("IVR") that may be suitably configured to receive a request from a user to find a story-based work. The IVR system may be suitably configured to execute various embodiments of the invention described herein.

User System 845

The user system 845 may include a computer that may be suitably configured to access a suitable website or other Internet-based graphical user interface that is accessible by users. In another example, the user system 845 may include a computer that may be suitably configured to access a suitable website or other Internet-based graphical user interface that is provided by search system 810. Additionally, components such as ACCESS or SQL SERVER, ORACLE, SYBASE, INFORMIX MYSQL, INTERVASE, etc., may be used to provide an ADO-compliant database management system. The term "web page" as it is used herein is not meant to limit the type of documents and applications that might be used to interact with the user. For example, a typical website might include, in addition to standard HTML documents, various forms, JAVA applets, Javascript, active server pages (ASP), common gateway interface scripts (CGI), extensible markup language (XML), dynamic HTML, cascading style sheets (CSS), helper applications, plug-ins, and/or the like.

As used herein, the terms "user", "end user", "consumer", "customer" or "participant" may be used interchangeably with each other, and each shall mean any person, entity, machine, hardware, software, and/or business. Also, each user may be equipped with a computing system to facilitate online transactions. For example, the user may have a computing unit in the form of a personal computer, although other types of computing units may be used including laptops, notebooks, hand held computers, set-top boxes, processors embedded in video devices and/or the like. The user computer may be in a home or business environment with access to a network. In an exemplary embodiment, access may be through the Internet through a commercially available web-browser software package.

The information may be communicated to search system 810 directly in electronic format, e.g., via a web page. Communication between the user and the system of the invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art may also appreciate that, for security reasons, any databases, systems, or components of the invention may consist of any combination of databases or components at a single location or at multiple locations, wherein each database or system includes any of various suitable security features, such as firewalls, access codes, encryption, de-encryption, compression, decompression, and/or the like.

It may be appreciated that many applications of the invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant (e.g., PALM PILOT®), handheld computer, cellular phone and/or the like. Similarly, the invention could be used in conjunction with any type of personal computer, network computer, workstation, minicomputer, mainframe, or the like running any operating system such as any version of WINDOWS, WINDOWS NT, WINDOWS2000, WINDOWS 98, WINDOWS 95, MACOS, OS/2, BEOS, LINUX, UNIX, SOLARIS or the like. Moreover, although the invention is described herein as being implemented with TCP/IP communications protocols, it may be readily understood that the invention could also be implemented using IPX, APPLETALK, IP-6, NetBIOS, OSI or any number of existing or future protocols. Moreover, the system may contemplate communication over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the search system 810 might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to the network via data links. A variety of conventional communications media and protocols may be used for data links. For example, a link may be a connection to an Internet Service Provider (ISP) over the local loop as is typically used in connection with standard modem communication, cable modem, Dish networks, ISDN, Digital Subscriber Line (DSL), or various wireless communication methods. The systems might also reside within a local area network (LAN) that interfaces to the network via a leased line (T1, D3, etc.). Such communication methods are well known in the art and are covered in a variety of standard texts. See, e.g., GILBERT HELD, UNDERSTANDING DATA COMMUNICATIONS (1996), hereby incorporated by reference.

Databases

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), MICROSOFT ACCESS or MICROSOFT SQL SERVER by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like.

The invention may be described herein in terms of functional block components, optional selections and/or various processing steps. It should be appreciated that such functional blocks may be realized by any number of hardware and/or software components suitably configured to perform the specified functions. For example, the invention may employ various integrated circuit components, e.g., memory elements, processing elements, logic elements, look-up tables, and/or the like, which may carry out a variety of functions under the control of one or more microprocessors or other control devices. Similarly, the software elements of the invention may be implemented with any programming or scripting language such as C, C++, JAVA, COBOL, assembler, PERL, VISUAL BASIC, SQL Stored Procedures, extensible markup language (XML), with the various algorithms being implemented with any combination of data structures, objects, processes, routines or other programming elements. Further, it should be noted that the invention may employ any number of conventional techniques for data transmission, messaging, data processing, network control, and/or the like.

It should be appreciated that the particular implementations shown and described herein are illustrative of the invention and its best mode and are not intended to otherwise limit the scope of the invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical story-based media search system.

As may be appreciated by one of ordinary skill in the art, the invention may be embodied as a method, a data processing system, a device for data processing, and/or a computer program product. Accordingly, the invention may take the form of an entirely software embodiment, an entirely hardware embodiment, or an embodiment combining aspects of both software and hardware or other physical devices. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that may direct a computer or other programmable data processing apparatus to function in a particular manner, such that the instructions stored in the computer-readable memory produce an article of manufacture including instruction means which implement functions of flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

In the foregoing specification, the invention has been described with reference to specific embodiments. However, it may be appreciated that various modifications and changes may be made without departing from the scope of the invention. The specification and figures are to be regarded in an illustrative manner, rather than a restrictive one, and all such modifications are intended to be included within the scope of invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method for assisting a user in searching for a pre-existing complete story-based work based on what is in said pre-existing complete story-based work, said story-based work represented in a work database by a work name, wherein the user is a person, the method comprising the steps of:
   receiving input from the user that specifies a first desired character type, wherein said first desired character type is a first desired story-character type, wherein said first desired character type is specified upon selection by the user of a first desired character quality from among a plurality of desired character qualities,
      wherein said plurality of desired character qualities comprise at least one of: various character personalities, various character religious viewpoints, level of positive portrayal of character, character's level of success in portrayed endeavors;
   receiving input from the user that further specifies said first desired character type, wherein said first desired character type is further specified upon selection by the user of a second desired character quality from among said plurality of desired character qualities;
   a processor searching said work database, wherein said work database stores a plurality of work names associated respectively with a plurality of pre-existing complete story-based works, wherein each of said plurality of story-based works is associated with at least one work character, wherein each of said at least one work character is associated with more than one work character quality;
      wherein said plurality of story-based works each comprise a complete work and each comprise one of a complete movie, a complete television program, a book, a novel, and a play;
   storing in said work database a score for each work character quality representing the degree to which said at least one work character exhibits the respective work character quality in the respective work; and
   identifying at least one of said plurality of pre-existing complete story-based works that has a first work character that has a character quality that is substantially similar to said specified first desired character type.

2. The method of claim 1, wherein said identifying step further comprises the step of displaying work names in order of relevancy beginning with the work names that are the most similar to said specified first desired character type.

3. The method of claim 1, further comprising the steps of:
   receiving input from the user that specifies a second desired character type, wherein said second desired character type is specified upon selection by the user of a third desired character quality from among said plurality of desired character qualities;
   wherein said work database further stores at least one character quality that is associated with a second work character who appears in at least one of said plurality of story-based works; and
   identifying at least one of said plurality of story-based works that contain both said first and second work characters that respectively are substantially similar to said specified first and second desired character types.

4. The method of claim 3, further comprising the steps of:
   receiving an importance input from the user for each selected desired character quality for each specified desired character type, wherein each received importance input indicates the relative importance of the presence of the respective selected desired character quality relative to each other selected desired character quality; and
   associating respectively a numeric importance value with each selected desired character quality based on each respective importance input, wherein each said numeric importance value represents the relative importance of each selected desired character quality.

5. The method of claim 1 further comprising the steps of:
   receiving said input specifying a first desired character type by the user selecting tree nodes and sub-tree nodes under a first desired character node.

6. A method of assisting a user in searching for a pre-existing complete story-based work from a plurality of pre-existing complete story-based works, represented in a work database by a work name, based on specified desired character relationships within said pre-existing complete story-based work, wherein the user is a person, the method comprising the steps of:
   receiving a first input from the user specifying a desired type of relationship between a first character and a second character in said pre-existing complete story-based work,
      wherein said desired type of relationship comprises at least one of: a family relationship, an emotional relationship, an interpersonal relationship, a romance relationship, a friendship, an antagonistic relationship, a hierarchical relationship, a work or office relationship and a competitive relationship;
      wherein said pre-existing complete story-based work is one of a complete movie, a complete television program, a book, a novel, and a play; and
   a processor identifying, in said work database, said pre-existing complete story-based work that includes at least said first character and said second character whose relationship in said pre-existing complete story-based work is substantially similar to said specified desired type of relationship, wherein said work database stores a plurality of work names associated respectively with said plurality of pre-existing complete story-based works.

7. The method of claim 6, wherein said work database stores a score representing the amount of presence in said story-based work of said specified desired type of relationship between said first and second characters in said story-based work.

8. The method of claim 6, wherein said first character and said second character are human beings.

9. The method of claim 6, further comprising the steps of:
receiving further input from the user that specifies a first desired character type of said first character, wherein said first desired character type is specified by the user by selecting a first desired character quality from among a plurality of desired character qualities,
wherein said plurality of desired character qualities comprise at least one of: various character occupations, various character belief systems, various character personalities, level of positive portrayal of character, age group of character, sex of character, character's level of success in portrayed endeavors;
searching said work database, wherein said work database further stores at least one work character quality that is associated with a first work character who appears in at least one of said works; and
wherein said identifying step further requires that said first character has a character quality that is substantially similar to said specified first desired character type.

10. The method of claim 9, further comprising the steps of:
receiving further input from the user that specifies a second desired character type associated with said second character, wherein said second desired character type is specified by the user by selecting a second desired character quality from among said plurality of desired character qualities;
searching said work database, wherein said work database further stores at least one work character quality that is associated with a second work character who appears in at least one of said works; and
wherein said identifying step further requires that said second character has a character quality that is substantially similar to said specified second desired character type.

11. A method for assisting a user in a two-stage search for a pre-existing complete story-based work based on story-based criteria, wherein said pre-existing complete story-based work is represented in a work database by a work name, wherein the user is a person, and wherein the two stages comprise:
an initial stage entailing a search for a first desired story-based criterion, wherein said search comprises the steps of:
receiving at least one input from the user denoting the user's interest in story-based criteria; and
receiving from the user a selection of said first desired story-based criterion, from among a plurality of story-based criteria, wherein said plurality of story-based criteria comprise at least one of: prevalence of heroism in said story-based work, prevalence of various types of dramatic behaviors in said story-based work, degree of presence of various sociopolitical themes of said story-based work, prevalence of various types of sex appeal in said story-based work, and degree of various types of aggressive content in said story-based work; and
a subsequent stage comprising the steps of:
a processor searching a work database, wherein said work database stores a plurality of work names associated respectively with a plurality of pre-existing complete works, wherein said work database further stores at least one work story-based criterion that is associated with a first work of said plurality of pre-existing complete works, wherein said work database stores a score that is associated with each said at least one work story-based criterion, wherein each said score represents the degree to which said story-based work exhibits the story-based criterion, wherein said score has at least three possible values;
wherein said plurality of pre-existing complete works each comprise one of a complete movie, a complete television program, a book, a novel, and a play; and
identifying, from among said plurality of pre-existing complete works, at least one pre-existing complete story-based work whose score in said first desired story-based criterion is greater than or equal to the score in said first desired story-based criterion of each other of said plurality of pre-existing complete works in said work database.

12. The method of claim 11, wherein said initial stage further comprises the displaying of said plurality of story-based criteria in a hierarchal format, and wherein said initial stage step of receiving from the user a selection of said first desired story-based criterion further comprises the selecting by the user of at least one of said plurality of story-based criteria from the hierarchal display of said plurality of story-based criteria.

13. A method for assisting a user in a two-stage search for a pre-existing complete story-based work based on story-based criteria, wherein said pre-existing complete story-based work is represented in a work database by a work name, wherein the user is a person, and wherein the two stages comprise:
an initial stage entailing a search for a first desired story-based criterion, wherein said search comprises the steps of:
receiving at least one input from the user denoting the user's interest in story-based criteria; and
receiving from the user a selection of said first desired story-based criterion, from among a plurality of story-based criteria, wherein said plurality of story-based criteria comprise at least one of: prevalence of heroism in said story-based work, prevalence of various types of dramatic behaviors in said story-based work, degree of presence of various sociopolitical themes of said story-based work, prevalence of various types of sex appeal in said story-based work, and degree of various types of aggressive content in said story-based work;
wherein said initial stage further entails a search for a second desired story-based criterion comprising the steps of:
receiving further input from the user that further denotes the user's interest in story-based criteria; and
receiving from the user a selection of said second desired story-based criterion, from among said plurality of desired story-based criteria; and
a subsequent stage comprising the steps of:
a processor searching a work database, wherein said work database stores a plurality of work names associated respectively with a plurality of pre-existing complete works, wherein said work database further stores at least one work story-based criterion that is associated with a first work of said plurality of pre-existing complete works, wherein said work database stores a score that is associated with each said at least one work story-based criterion, wherein each said score represents the degree to which said story-based work exhibits the story-based criterion, wherein said score has at least three possible values;

wherein said plurality of pre-existing complete works each comprise one of a complete movie, a complete television program, a book, a novel, and a play; and identifying, from among said plurality of pre-existing complete works, at least one work whose total score is greater than or equal to the total score of each other of said plurality of pre-existing complete works in said work database, wherein the total score T is computed as the sum of a function of $S_1$ and a function of $S_2$, wherein $S_1$ is the score in the first desired story-based criterion and $S_2$ is the score in the second desired story-based criterion.

14. The method of claim 12, further comprising the steps of:

receiving an importance input from the user for each selected desired story-based criterion, wherein each received importance input indicates the relative importance of the presence of the respective selected desired story-based criterion relative to all the other selected desired story-based criteria; and associating respectively a numeric importance value with each selected desired story-based criterion based on each respective importance input, wherein each said numeric importance value represents the relative importance of each selected desired story-based criterion; and wherein said identifying further comprises identifying at least one work whose total score is greater than or equal to the total score of each other of said plurality of pre-existing complete works in said work database, wherein the total score is computed as $T=I_1 S_1+I_2 S_2$, wherein $I_1$ is the numeric importance value associated with the first desired story-based criterion, and $I_2$ is the numeric importance value associated with the second desired story-based criterion.

15. The method of claim 13, further comprising the steps of:

receiving an importance input from the user for each selected desired story-based criterion, wherein each received importance input indicates the relative importance of the presence of the respective selected desired story-based criterion relative to all the other selected desired story-based criteria;

associating respectively a numeric importance value with each selected desired story-based criterion based on each respective importance input, wherein each said numeric importance value represents the relative importance of each selected desired story-based criterion; and receiving from a user a first max/min input associated with said first desired story-based criterion indicating that the user desires that a work exhibit one of: (a) as much of said first desired story-based criterion as possible, and (b) as little of said first desired story-based criterion as possible, wherein said identifying further comprises identifying at least one work whose total score is greater than or equal to the total score of each other of said plurality of pre-existing complete works in said work database, wherein the total score is computed as $T=w_1 I_1 S_1+I_2 S_2$, wherein $w_1=1$ if said first max/min input is (a) and $w_1=-1$ if said first max/min input is (b), and wherein $I_1$ is the numeric importance value associated with the first desired story-based criterion, and $I_2$ is the numeric importance value associated with the second desired story-based criterion.

16. The method of claim 15, wherein said identifying further comprises identifying works in order of total score.

17. A graphical method for assisting a user in searching for a work, wherein the user is a person, the graphical method including the steps of:

displaying icons that represent character types desired by the user;

for one or more of said icons, receiving at least one user input specifying desired qualities of the character type, where each desired quality is selected from among a plurality of character qualities;

receiving an input, from a user, referencing two of said icons, and responding to said input by displaying a graphical connection between said icons, and wherein each graphical connection represents a relationship between characters of the character type represented by the icon;

wherein said relationship between characters comprises at least one of: a family relationship, an emotional relationship, an interpersonal relationship, a romance relationship, a friendship, an antagonistic relationship, a hierarchical relationship, a work or office relationship and a competitive relationship;

receiving user input, associated with each said graphical connection, representing desired qualities of the relationship between the characters that correspond to the icons so connected, where each desired quality is selected from among a plurality of relationship qualities; and a processor searching a work database that contains a plurality of works and identifying at least one of said plurality of works that has characters and relationships substantially similar to the character types and relationships desired by the user, wherein said plurality of works each comprise at least one of a complete movie, a complete television program, a book, a novel, and a play.

18. A method of assisting a user in searching for a pre-existing complete work through use of story-based criteria, wherein the user is a person, the method comprising the steps of:

assisting the user in finding and selecting story-based criteria comprising the steps of: presenting a plurality of story-based search criteria, wherein the plurality of story-based search criteria comprise at least one of: heroism, various types of dramatic behaviors, various sociopolitical themes, various types of sex appeal, and various types of aggressive content; and receiving from the user inputs representing selections of story-based criteria that are to be used in a search;

receiving from the user, for each selected story-based criterion, an indication of the importance of that story-based criterion, wherein the importance of a criterion indicates how much the user wishes the criterion to affect the search results, relative to how much the other criteria affect the search results;

a processor searching a work database, wherein said work database stores a plurality of work names associated respectively with a plurality of pre-existing complete works, wherein each of said plurality of pre-existing complete works is associated with at least one work story-based criterion; wherein said plurality of pre-existing complete works each comprise at least one of a complete movie, a complete television program, a book, a novel, and a play;

identifying at least one of said plurality of pre-existing complete works where said at least one of said plurality of pre-existing complete works comprise work story-based criteria that are substantially similar to said selected story-based criteria; and presenting to the user said identified works in order of relevancy based on user provided indications of importance and on the degree to which said works comprise work story-based criteria that are substantially similar to said user provided selections of story-based criteria.

* * * * *